United States Patent [19]

Tallafus

[11] Patent Number: 4,697,508

[45] Date of Patent: Oct. 6, 1987

[54] COOLING AUGER

[76] Inventor: Ottmar Tallafus, Am Himmelreich 14, 6967 Buchen 1, Fed. Rep. of Germany

[21] Appl. No.: 797,163

[22] Filed: Nov. 12, 1985

[30] Foreign Application Priority Data

Nov. 13, 1984 [DE] Fed. Rep. of Germany ....... 3441425

[51] Int. Cl.⁴ .......................... A23B 4/06; F25D 13/06
[52] U.S. Cl. ........................................... 99/517; 62/63; 62/381; 99/534; 165/109.1; 366/149; 366/319
[58] Field of Search ................. 99/516, 517, 534, 470; 62/63, 68–70, 378, 380, 381, 384; 165/109.1, 120; 366/145, 149, 144, 318, 319, 81; 118/20, 24

[56] References Cited

U.S. PATENT DOCUMENTS

| | | | |
|---|---|---|---|
| 2,289,727 | 7/1942 | Randolph | 99/517 X |
| 3,214,928 | 11/1965 | Oberdorfer | 62/63 |
| 4,237,782 | 12/1980 | Bichel | 99/516 X |
| 4,476,686 | 10/1984 | Madsen et al. | 99/517 X |
| 4,569,204 | 2/1986 | Ott et al. | 62/381 X |

*Primary Examiner*—Timothy F. Simone

[57] ABSTRACT

An apparatus for transporting and at the same time cooling sensitive and perishable goods such as sliced vegetables by means of an auger including a transport screw disposed in a trough-like housing provided with an insulating jacket and an insulated lid arranged in spaced relationship from the transport screw, wherein the transport screw has coils with bulged rounded outer edges which are spaced from the trough housing wall and wherein a coolant injection pipe is disposed in the space between the transport screw and the lid of the trough for introducing a cooling fluid into the trough while the goods are moved therethrough thereby providing direct contact of the cooling fluid with the large surface area of the goods to be cooled for efficient and rapid cooling of the goods.

14 Claims, 3 Drawing Figures

COOLING AUGER

BACKGROUND OF THE INVENTION

The invention relates to an arrangement for moving and cooling sensitive and perishable goods especially sliced raw vegetables, raw lettuce and mushrooms using an inclined auger with a feeding hopper.

Raw vegetables and raw lettuce, also sliced cucumbers, tomatoes, paprika, radishes, carrots, red beets, cabbage, water cress, etc. must not only be immediately processed after cutting but they must also be kept refrigerated. The various products arrive at a processing station in a refrigerated state while the processing station itself is maintained essentially at normal room temperature. After processing—cleaning, washing, cutting—the various vegetables and lettuce which, meanwhile, have assumed almost room temperature, must again be cooled down to a temperature of 1° C. to 4° C. At the same time, it is desirable to mix various vegetables for preparing vegetable mixtures which are then transferred to a packaging station. The whole process after cutting, that is cooling, mixing and packaging, should be performed automatically not only because handling of the cold goods is a difficult and undesirable task for operating personnel but also because hygienic handling requirements lead to automatic processing.

In present processing plants refrigerating and a mixing of the goods represents a bottle neck since especially refrigeration of the goods requires a certain amount of time depending on the amount of the goods delivered. In the same amount of time other products may already have been cooled down and are ready for mixing wherein however the mixing can be performed only after all the various separate products have reached the necessary low temperature.

The mixing shelf is also difficult because the above mentioned foods have a high water content and therefore are easily squashed which gives them an unappetizing appearance so that they are hardly "suitable for human consumption". The mixing apparatus presently utilized can therefore accept only small amounts at a time and can process these amounts only batch-wise. During such mixing process the goods generally become undesirably warm so that bacteria infestation is substantially increased during this process.

Furthermore, the mixed goods must then by supplied to a packaging station which usually results in moving the goods to a higher location into the hopper of the packaging equipment. The transport equipment used herefor will properly move the goods as desired but it will also cause warming up of the goods to an undesirable degree. This will happen to an even less desirable degree if there is a delay somewhere in the handling process so that the raw goods cannot be continuously processed as planned.

It is therefore the object of the present invention to provide an apparatus for transporting that is for lifting and cooling and, at the same time, mixing such goods which permits not only continuous operation but also provides at the same time for refrigeration of the goods or at least for maintaining them refrigerated.

SUMMARY OF THE INVENTION

An apparatus for transporting and mixing and, at the same time, refrigerating sensitive perishable goods such as sliced vegetables utilizes an auger including a transport screw disposed in a trough-like housing provided with an insulating jacket and an insulated lid covering the trough-like housing and disposed in spaced relationship from the transport screw. The transport screw has coils with bulged rounded outer edges which are spaced from the trough housing wall for moving and lifting the goods without damaging them and a coolant injection pipe is disposed in the space between the transport screw and the lid of the trough for introducing a cooling fluid into the trough while the goods are moved therethrough thereby providing for rapid cooling by direct contact of the cooling fluid with the goods to be cooled.

The goods under consideration are loose and generally fluffy providing for a large surface area and good exposure to the coolant, generally cold gas, so that the goods are cooled very rapidly and efficiently.

In contrast to previous processing arrangements wherein the various goods are separately refrigerated, all the various goods are filled into the hopper of a cooling and mixing anger and they are together mixed and intensely cooled within the auger. The various products are, of course, kept refrigerated while they are supplied to the auger hopper; they may for example be supplied to the hopper through a refrigerated tunnel or the space generally may be refrigerated through which the goods are moved. Refrigeration of the goods to the desired temperature of 1° C. to 4° C. as mentioned above however is accomplished only during their movement through the cooling and mixing auger which carries the goods to the packing station. As a result the temperature of the goods is continuously reduced during the processing from the temperatures the various goods have upon delivery until all the goods reach the optimum temperature of 1° C. to 4° C. at the packing station. Temperature changes which were hardly avoidable with prior art processes and which always results in quality losses, are avoided therefore.

In addition the arrangement according to the invention permits continuous operation since the various goods are admitted to the hopper of the mixing and cooling auger all at the same time and are mixed and cooled therein in a continuous fashion. Backups as they occurred in the batch-type operations used so far are therefore also avoided. Further avoided are losses in quality caused normally by relatively long processing times of these very perishable foods.

It has further been found that, with the process equipment according to the invention, it is not only possible to cool the goods to the given temperatures but, surprisingly, it permits also flash chilling and further freezing of suitable goods. For this purpose liquid coolant such as liquid nitrogen or liquid oxygen is sprayed onto the goods by means of the injection pipe. With this method temperatures down to −170° C. can be achieved at high refrigeration speeds of up to 100 cm/h.

Augers are known of course; even augers in which the goods are cooled during transport are known. The German DOS 3037599 for example discloses an auger with a screw supported in a trough which has double walls for receiving between the two walls a heat exchange fluid and which has even tubes arranged in the area around the screw which tubes are adapted to receive the same heat exchange fluid as the double wall structure. However such an auger would not be suitable for inclined upward transport and concurrent mixing of the sensitive goods described earlier, since the tubes installed in the auger would squash those goods and, as a result, make them unsuitable for consumption and, furthermore, since the heat exchange surfaces provided by the housing walls and even the tubes are too small to be able to reduce the temperature of the goods within the relatively short travel distance that is within the relatively short travel time, by the desired amount of 10° C. to 15° C. Short travel distances and short travel times however are necessary in order to avoid quality losses of the goods as a result of extended exposure thereof to the mechanical wear and tear of the auger screw. With regard to the relatively small heat exchange surface areas mentioned above it is to be noted that nevertheless the temperature of the heat exchange fluid must not be substantially below 0° C. because of the high water content of the goods to be moved if those goods are not to be frozen. The temperature difference between the goods in the auger and the cooling surfaces is therefore only relatively small so that the goods cannot possibly be cooled throughout the transport flow cross-sectional area with the given short travel length.

The present invention utilizes a different principle: Instead of providing cooling for the trough surfaces, the trough surfaces are insulated and the goods in the trough are directly cooled by introduction of a liquid or gaseous coolant.

There are augers with transport screws wherein a liquid is conducted through the transport screw (FR Patent 751884) but the liquid is used therein for the purpose of initiating a process of conversion of the transport goods. In accordance with the invention liquid refrigerant is introduced only when extraordinary situations occur that is when relatively warm transport goods are supplied to the auger; if however the transport of the goods in the auger is stagnant, only gaseous coolant is injected in order to prevent freezing of the goods if the goods are to remain unfrozen. If, however freezing of the goods is desired then liquid refrigerant is injected into the auger in order to obtain the desired rapid cooling of the goods.

Generally the transport screw and trough are so formed that the screw coils move along the trough surfaces with as little spacing as possible. It is generally believed that otherwise there would be relatively high wear and squashing of the goods to be transported. Surprisingly, it has been found that this general belief is not correct but that the goods with which the present invention is concerned becomes squashed, unsightly and unfit for consumption if an auger built in accordance with the general belief is utilized. Surprisingly it has been found that the spacing provided between the outer edges of the transport screw coils and the surrounding trough surfaces, which in accordance with the invention is about twice the thickness of the transport goods, results in the transport of the goods without any squash marks and also in excellent mixing of the goods during their transport trough the auger. A factor contributing to such good results is without doubt the shape of the coils of the auger screw which, in accordance with the invention have rounded and bulged edges. Another factor providing for the good mixing and transport results is likely the concurrent cooling which causes stiffening of the goods such that they are easier transported with the relatively large clearance between the screw coils and the auger housing.

Good refrigeration of the goods is achieved not only by keeping the whole transport path of the goods cool but also by another feature of the present invention according to which the screw coil's pitch is substantially increased outside the feeding hopper so that the goods to be cooled are loosened up and are fully surrounded by the cooling gas flowing past the goods.

Preferably, the refrigerant injection pipe is connected at the hopper since this is where the need for cooling is largest for fast refrigeration of the goods. For flash freezing however, an injection pipe may be arranged at the discharge end of the auger so that the coolant is conducted through the auger in counterflow to the goods.

In order to insure continuous travel of the goods through the mixing and cooling auger, that is in order to prevent the formation of arches in the hopper there is arranged in the hopper a pneumatically or hydraulically operated crank adapted to pivot back and forth by about 90°. For operation of the auger according to the invention liquid or gaseous nitrogen is admitted to the auger through the injection pipe and admission of the coolant is controlled by a controller depending on temperature signals supplied by temperature sensors arranged in the bottom and the lid of the trough and also at the trough discharge. Admission of liquid nitrogen at a temperature of −196° C. is possible with certain goods if hard-freezing is desired since the water content of the raw vegetables and raw lettuce is very high so that frost marks caused by partial localized freezing of the goods as a result of being subject to nitrogen droplets is not likely. Preferably however, admission of liquid and gaseous nitrogen is separate and separably controlled so as to admit liquid nitrogen only in cases of need that is, for example when the volume of the goods to be transported swells to maximum and, at the same time, those goods are supplied in a relatively warm state.

In place of nitrogen, liquid and/or gaseous oxygen may be utilized as refrigerant. Surprisingly, it has been found that the use of oxygen will not cause quality losses as one would have expected but that, contrary to the expected result, a quality improvement was achieved which resulted in better appearance of the goods so treated.

The auger according to the invention may at the same time, be utilized as a dosaging device if a rapidly controllable motor is used as the drive motor for the auger screw. Then the transport speed of the goods can be controlled as desired and the screw can be stopped instantly upon delivery of a certain amount of goods. In order to achieve an immediate stop of the delivery of goods upon receiving the stop signal the motor is controlled by a dosage control not only to stop immediately upon reception of the stop signal but to reverse for a couple of turns to make sure that no additional goods are discharged.

SHORT DESCRIPTION OF THE DRAWINGS

FIG. 1 is a side view of the mixing and cooling auger;
FIG. 2 is a sectional view along line II—II of FIG. 1; and
FIG. 3 is a partial view of the transport screw.

DESCRIPTION OF THE PREFERRED EMBODIMENT

Figure 1:
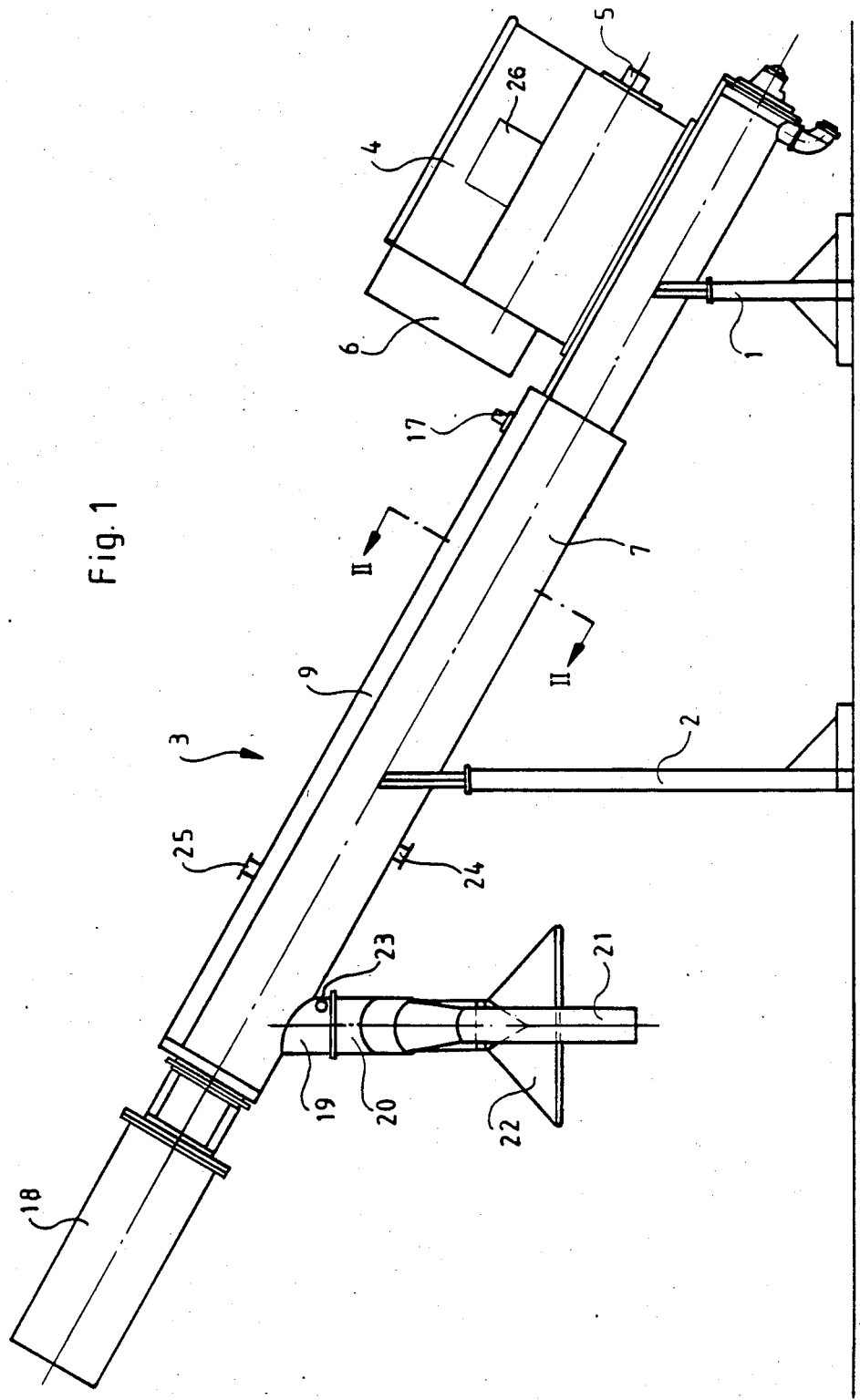
Figure 2:
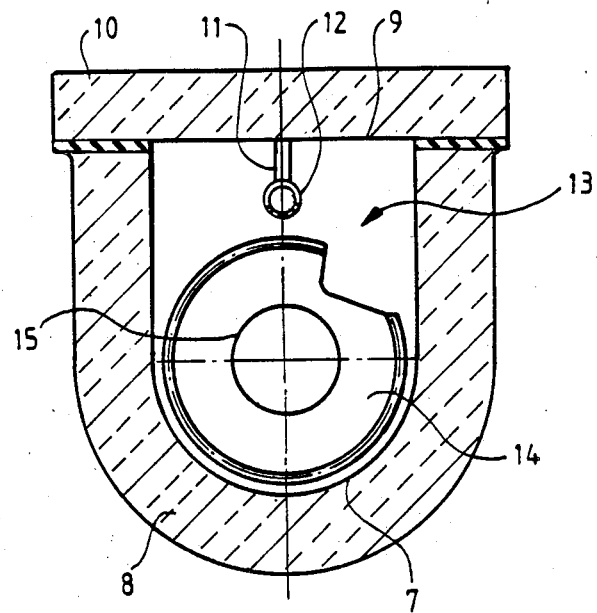
Figure 3:
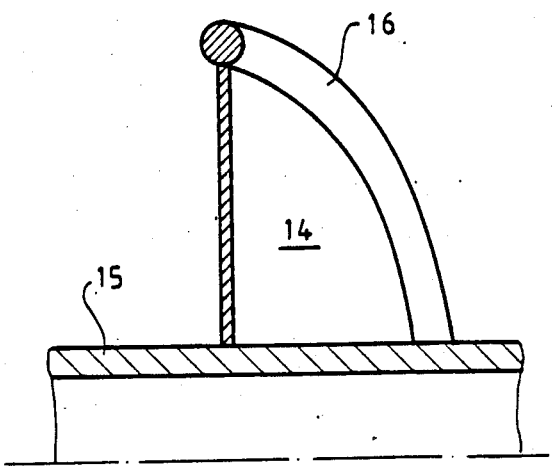

A mixing and cooling auger 3 is supported on support columns 1, 2 at an angle of about 45° with respect to a horizontal plane. At its lower end the auger 3 is provided with a feeding hopper hopper 4 with a crank shaft 5 supported therein so as to be pivotable back and forth by a pneumatic or hydraulic operating cylinder arranged in the housing 6 and operatively connected to the crank shaft 5. The goods to be transported slide down the feeding hopper 4 if necessary with the aid of a vibrator 26 mounted on the hopper 4, into a trough 7 of the auger which is provided with an insulating jacket 8 as is clearly shown in FIG. 2. The trough 7 is covered by a lid 9 which is also provided with an insulation layer 10. The lid 9 carries on a hanger 11 an injection pipe 12 through which liquid or gaseous refrigerant is introduced into the interior 13 of the trough. The supply stub 17 for the injection pipe 12 is arranged on the lid 9 adjacent the feeding hopper 4.

The transport screw 14 arranged in the trough 7 is disposed on a hollow shaft 15 and the coils of the transport screw 14 have bulged outer edges 16. The outer edges of the screw coils are arranged at substantial spacing from the trough bottom walls the spacing being about twice the thickness of the goods to be transported, for example twice the thickness of a cucumber slice or twice the thickness of the stems of mushrooms to be moved through the trough. The pitch of the auger screw is substantially increased after an initial portion in the hopper 4. This results in a loosening of the transported goods and also in good exposure of the goods to the cooling gases. The hollow shaft 15 is operatively connected to an accurately controllable drive motor 18. At the end of the trough 7 when seen in transport direction there is provided a discharge member 19 having a branch piece 20. The branch piece 20 divides the discharge member 19 by means of a suitable diverter flap into an overflow section 21 and a packaging shield 22. On the discharge member 19, on the bottom of the trough 7 and also on its lid 9 there are provided temperature sensors 23, 24, 25 for sensing the temperature at the given locations.

During operation of the mixing and cooling auger 3 the pre-cooled goods are admitted by way of the hopper 4. Formation of arches by the goods in the hopper is prevented by the crank shaft 5 operated in the housing 6 by way of pneumatically or hydraulically operated drive means and by a vibrator mounted on the hopper 4. The goods supplied to the trough 7 will therefore drop onto the screw 14 rotating within the trough 7 and are moved upwardly through the trough 7 to the discharge member 19. Liquid or gaseous nitrogen is admitted to the trough 7 by way of the supply stub 17 and the injection pipe 12 arranged in the trough interior to such a degree that the goods at the discharge 19 as measured by the temperature sensor 23 have a temperature of 1° to 4° C. The admission of nitrogen is controlled by a controller utilizing the temperature sensors 23, 24 and 25. Heat loss or rather heat conduction into the auger is minimized by the insulating jacket 8 of the trough and the insulating layer 10 of the lid.

The arrangement according to the invention makes it possible, within a relatively short transport distance of form example only 3 m, not only to transport the sensitive goods without loss of quality but at the same time to cool them down to packaging temperatures and by supplying various goods at the same time to also mix these goods. In addition the nitrogen, if used for cooling provides a protective atmosphere so that also the bags filled in the packaging station contain goods which are thoroughly cooled and surrounded by a protective atmosphere.

I claim:

1. An apparatus for transporting and cooling sensitive and perishable goods especially sliced raw vegetables and raw lettuce said apparatus comprising an auger, a feeding hopper arranged at one end of said auger, and a discharge structure at the other end of said auger, said auger having a transport screw disposed in a trough-like housing, a heat insulating jacket disposed around said trough-like housing, a heat insulated lid disposed on said trough-like housing in spaced relationship from said transport screw with a coolant injection pipe disposed in the space between said transport screw and the lid of said trough for the introduction of a cooling fluid into said auger, and having coils with bulged rounded outer edges being so arranged in said trough that said rounded outer edges are spaced from the trough walls and the pitch of the coils of the transport screw in said trough being substantially larger than in said feeding hopper into which the transport screw extends.

2. An apparatus according to claim 1, wherein said transport screw and said trough housing are matched so as to provide between the outer coil edges of the transport screw and the trough housing a space corresponding to about twice the thickness of the goods to be transported.

3. An apparatus according to claim 1, wherein said coolant injection pipe is connected to a coolant supply line adjacent said hopper.

4. An apparatus according to claim 1, wherein temperature sensors are arranged at the bottom of said trough, the trough lid, and at the auger discharge.

5. An apparatus according to claim 1, wherein a crank shaft is mounted in said hopper and adapted to pivot back and forth by about 90° in order to prevent blockage in the hopper.

6. An apparatus according to claim 1, wherein a vibrator is associated with said hopper.

7. An apparatus according to claim 1, wherein a drive motor is coupled to said transport screw, said drive motor being an accurately and rapidly controllable electric motor.

8. An apparatus according to claim 7, wherein a motor control is utilized which is adapted to control the motor speed depending on the amount of goods to be delivered for dosaging said goods.

9. An apparatus according to claim 8, wherein said motor control is adapted to reverse the motor for a couple of turns upon reception of a stop delivery signal.

10. An apparatus according to claim 4, wherein said injection pipe is connected to a supply of liquid and gaseous cooling fluids, and the supply is controllable by a controller depending on the values supplied to the controller by said temperature sensors.

11. An apparatus according to claim 10, wherein said liquid and gaseous cooling fluid supplies are separate and selectively connectable to said injeciton pipe.

12. An apparatus according to claim 10, wherein said liquid and gaseous cooling fluids are nitrogen.

13. An apparatus according to claim 10, wherein said liquid and gaseous cooling fluids are oxygen.

14. An apparatus according to claim 10, wherein said liquid and gaseous cooling fluids consist of mixtures of nitrogen and oxygen.

* * * * *